(12) United States Patent
Hirano et al.

(10) Patent No.: US 8,115,612 B2
(45) Date of Patent: Feb. 14, 2012

(54) DISPLAY DEVICE FOR VEHICLE

(75) Inventors: Tomoki Hirano, Fujisawa (JP); Seiji Kadota, Fujisawa (JP); Masakatsu Ukai, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 453 days.

(21) Appl. No.: 12/514,803

(22) PCT Filed: Nov. 13, 2007

(86) PCT No.: PCT/JP2007/071976
§ 371 (c)(1),
(2), (4) Date: May 14, 2009

(87) PCT Pub. No.: WO2008/062689
PCT Pub. Date: May 29, 2008

(65) Prior Publication Data
US 2010/0060442 A1    Mar. 11, 2010

(30) Foreign Application Priority Data
Nov. 24, 2006    (JP) ................................ 2006-317593

(51) Int. Cl.
*B60Q 1/00*        (2006.01)
*G09F 9/00*        (2006.01)
*G08B 25/00*       (2006.01)
*G09G 3/04*        (2006.01)
(52) U.S. Cl. .................. 340/438; 340/439; 340/815.44; 340/461; 340/462; 340/691.6; 324/115; 324/166; 345/33; 345/34; 73/114.31; 73/114.71; 700/17; 701/99; 701/108; 701/123

(58) Field of Classification Search .................. 340/438, 340/461, 815.44
See application file for complete search history.

(56) References Cited

U.S. PATENT DOCUMENTS
4,375,667 A * 3/1983 Buchan ........................... 73/861
(Continued)

FOREIGN PATENT DOCUMENTS
JP    H05-187221 A1    7/1993
(Continued)

OTHER PUBLICATIONS
International Search Report for PCT/JP2007/071976 dated Dec. 5, 2007.

*Primary Examiner* — Donnie Crosland
(74) *Attorney, Agent, or Firm* — McCormick, Paulding & Huber LLP

(57) ABSTRACT

A display device for a vehicle that display an amount of a particulate matter collected in a filter device for exhaust gas purification. A vehicle 1 includes distance storage apparatus 46 for storing a travel distance, a filter device 5 for exhaust gas purification for trapping a particulate matter contained in an exhaust gas, and collected amount detection apparatus 25 for finding an amount of the particulate matter collected in the filter device 5 for exhaust gas purification. A display control unit 42 normally acquires a travel distance from the distance storage apparatus 46 and displays the travel distance as a numerical value on a segment display unit 41, and when instructed to display a collected amount of the particulate matter, the display control unit 42 acquires a collected amount from the collected amount detection apparatus 25 and lights up the number of segment groups 61 corresponding to the collected amount, thereby displaying the collected amount.

7 Claims, 3 Drawing Sheets

U.S. PATENT DOCUMENTS

| | | | |
|---|---|---|---|
| 4,685,116 A * | 8/1987 | Toumayan | 377/51 |
| 5,479,350 A * | 12/1995 | Barakchi et al. | 701/100 |
| 2005/0165523 A1 * | 7/2005 | Nakazawa et al. | 701/35 |

FOREIGN PATENT DOCUMENTS

| | | |
|---|---|---|
| JP | H07-317528 A1 | 5/1995 |
| JP | H10-006811 A1 | 1/1998 |
| JP | H11-132026 A1 | 5/1999 |
| JP | H11-264314 A1 | 9/1999 |
| JP | 2000-024440 A1 | 1/2000 |
| JP | 2002-147222 A1 | 5/2002 |
| JP | 2003-097977 A1 | 4/2003 |
| JP | 2005-106789 A1 | 4/2005 |
| JP | 2005-133607 A1 | 5/2005 |
| JP | 2005-344549 A1 | 12/2005 |
| JP | 2006-002705 A1 | 1/2006 |

* cited by examiner

| | ⬚88888 —41 | ✦—44 | ⁝✦—54 |
|---|---|---|---|
| COLLECTED AMOUNT STAGE 0 | TRIP A / ODO B  88888.8 | GREEN LIGHT | DISPLAY IS LIT UP |
| COLLECTED AMOUNT STAGE 1 | TRIP A / ODO B  08888.8 | | |
| COLLECTED AMOUNT STAGE 2 | TRIP A / ODO B  00888.8 | | |
| COLLECTED AMOUNT STAGE 3 | TRIP A / ODO B  00088.8 | | |
| COLLECTED AMOUNT STAGE 4 | TRIP A / ODO B  00008.8 | | |
| COLLECTED AMOUNT STAGE 5 | TRIP A / ODO B  00000.8 | | |
| COLLECTED AMOUNT ERROR DISPLAY | TRIP A / ODO B  8888.8 | | |
| REGENERATION PROGRESS STAGE 0 | TRIP A / ODO B  88888.8 | ORANGE LIGHT | |
| REGENERATION PROGRESS STAGE 1 | TRIP A / ODO B  0̲8888.8 | | |
| REGENERATION PROGRESS STAGE 2 | TRIP A / ODO B  00̲888.8 | | |
| REGENERATION PROGRESS STAGE 3 | TRIP A / ODO B  000̲88.8 | | |
| REGENERATION PROGRESS STAGE 4 | TRIP A / ODO B  0000̲8.8 | | |
| REGENERATION PROGRESS STAGE 5 | TRIP A / ODO B  00000̲.8 | | |

FIG.4

DISPLAY DEVICE FOR VEHICLE

CROSS REFERENCE TO RELATED APPLICATIONS

This application is entitled to the benefit of and incorporates by reference essential subject matter disclosed in International Patent Application No. PCT/JP2007/071976 filed on Nov. 13, 2007 and Japanese Patent Application No. 2006-317593 filed Nov. 24, 2006.

TECHNICAL FIELD

The present invention relates to a display device for a vehicle that displays an amount of a particulate matter collected in a filter for exhaust gas purification.

BACKGROUND ART

For example, particulate collection devices using various filters that are called DPD (registered trade name, Diesel Particulate Defuser) are used to collect a particulate matter (referred to hereinbelow as PM) contained in exhaust gas discharged from a diesel engine.

Where the filter is clogged by the collected PM in such a collection device, the exhaust gas is difficult to discharge. Therefore, the filter is regenerated by oxidizing and removing (combusting) the collected PM.

Active regeneration systems such as electric heating, burner combustion, and fuel addition and self-regenerating (also called passive) regeneration systems are known as DPD regeneration systems.

With an active regeneration system, a driver starts the regeneration by operating a switch. Therefore, the driver has to be notified about the degree to which PM has been accumulated in the filter.

Accordingly, a display device is known that displays an amount of PM collected in the filter.

For example, Japanese Patent Application Laid-Open No. 2000-24440 suggests a configuration in which a warning lamp is lit up correspondingly to the collected amount of PM and a configuration in which six LEDs representing a multi-stage warning unit are successively lit up when PM collection and regeneration of DPD are performed.

Furthermore, the collected amount of PM or regeneration state of DPD is displayed by lighting up or blinking the warning lamp and changing the blinking speed and interval.

DISCLOSURE OF THE INVENTION

However, the problem associated with the above-described display device is that a warning lamp or LEDs have to be added.

Performing the display using LED of Japanese Patent Application Laid-Open No. 2000-24440 on another display unit can also be considered, but this requires using a display unit having LEDs. Therefore, a limitation is placed on the type of display for such combined use and a special display has to be provided on some vehicles.

Accordingly, it is an object of the present invention to resolve the above-described problems and provide a display device for a vehicle that enables the display of an amount of a particulate matter collected in the filter device for exhaust gas purification, without adding a new display unit.

In order to attain the above-described object, the present invention provides a display device for a vehicle including a segment display unit that can display a numerical value of a plurality of digits and is provided with segment groups that display values of each digit, and a display control unit for displaying a travel distance of the vehicle on the segment display unit, wherein the vehicle includes distance storage means for storing a travel distance, a filter device for exhaust gas purification for trapping a particulate matter contained in an exhaust gas, and collected amount detection means for finding an amount of the particulate matter collected in the filter device for exhaust gas purification; and the display control unit normally acquires a travel distance from the distance storage means and displays the travel distance as a numerical value on the segment display unit, and when instructed to display a collected amount of the particulate matter, the display control unit acquires a collected amount from the collected amount detection means and lights up the number of segment groups corresponding to the collected amount, thereby displaying the collected amount.

It is preferred that the display control unit light up predetermined segments of the segment groups of each digit of the segment display unit when a collected amount is displayed.

It is preferred that the vehicle include a filter regeneration device for oxidizing the particulate matter collected in the filter device for exhaust gas purification and regenerating the filter device for exhaust gas purification. It is also preferred that the display control unit displays a regeneration progress state by lighting up the number of segment groups corresponding to a collected amount of the particulate matter detected by the collected amount detection means, when the filter device for exhaust gas purification is regenerated by the filter regeneration device.

It is preferred that the segment groups of the segment display unit be arranged side by side in a row in a horizontal direction, and the display control unit light up the number of segment groups corresponding to a collected amount successively from a segment group on either the left or right side and blink a segment group closest to the other side from among the segment groups that are lit up when a regeneration process state is displayed.

It is preferred that a collection-regeneration display unit be provided that can be lit up in two different colors and whose display is controlled by the display control unit, wherein the display control unit lights up one of the colors on the collection-regeneration display unit when the collected amount is displayed on the segment display unit and lights up the other color on the collection-regeneration display unit when the regeneration progress state is displayed.

It is preferred that the segment display unit and the collection-regeneration display unit be disposed close to each other on an instrument panel of the vehicle.

The present invention demonstrates an excellent effect of enabling the display of an amount of a particulate matter collected in the filter device for exhaust gas purification, without adding a new display unit.

BRIEF DESCRIPTION OF THE DRAWINGS

FIG. 4 serves to explain the display of a collected amount and a regeneration progress state with the display device for a vehicle of the present embodiment.

BEST MODE FOR CARRYING OUT THE INVENTION

The preferred embodiment of the present invention will be described below with reference to the appended drawings.

A display device for a vehicle of the present embodiment is applied to a vehicle equipped with a filter device for exhaust gas purification (exhaust gas treatment device) for purifying an exhaust gas of an internal combustion engine such as a diesel engine.

A schematic structure of the vehicle will be explained below based on FIG. 1.

Figure 1:
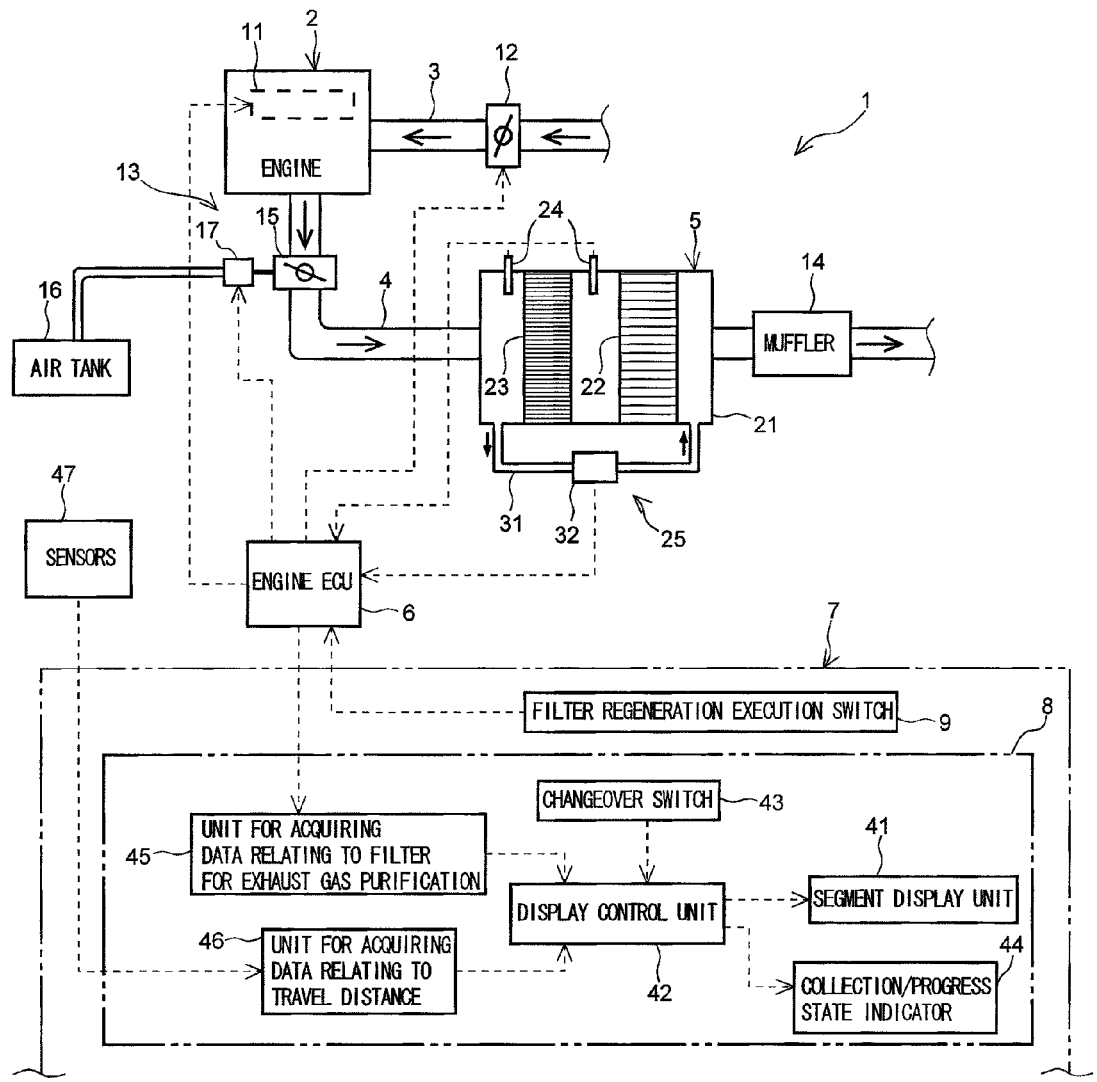
FIG. 1 shows a display device for a vehicle of one embodiment of the present invention.

As shown in FIG. 1, a vehicle 1 is provided with an engine 2 (a diesel engine in the example shown in the figure), an intake passage 3 for introducing new air (intake air) to the engine 2, an exhaust passage 4 for discharging an exhaust gas of the engine 2, a filter device 5 for exhaust gas purification for trapping a particulate matter (referred to hereinbelow as "PM") contained in the exhaust gas, and an electronic control unit (referred to hereinbelow as "engine ECU") 6 for controlling the engine 2.

A display device 8 for a vehicle that serves to show a travel distance of the vehicle 1 and a state of the filter device 5 for exhaust gas purification to a driver and a filter regeneration execution switch 9 for performing manual regeneration of the filter device 5 for exhaust gas purification are provided in a cab 7 (driver's cabin) of the vehicle 1.

A combustion chamber (not shown in the figure) is formed in the engine 2, and an injector 11 for injecting and supplying fuel is provided in the vicinity of the combustion chamber. The injector 11 is connected to the engine ECU 6, and a fuel injection amount and a fuel injection period are controlled by the engine ECU 6.

An intake throttle valve 12 for adjusting the amount of new air introduced in the engine 2 is provided in the intake passage 3. The intake throttle valve 12 is connected to the engine ECU 6, and the opening degree of the valve is controlled by the engine ECU 6. The intake throttle valve 12 can be, for example, a throttle valve with a continuously variable opening degree.

An exhaust gas brake device 13, the filter device 5 for exhaust gas purification, and a muffler 14 are provided in the order of description from an upstream side (engine side) in the exhaust passage 4.

The exhaust gas brake device 13 is provided with an exhaust throttle valve (for example, a throttle valve) 15 that is provided in the exhaust passage 4 and operated pneumatically and a pressure-controlled diversion valve 17 that adjusts the air pressure supplied from an air tank 16 to the exhaust throttle valve 15.

The pressure-controlled diversion valve 17 is connected to the engine ECU 6 and the opening degree of the valve is controlled by the engine ECU 6 to adjust the air pressure (vale opening degree) supplied to the exhaust throttle valve 15.

The filter device 5 for exhaust gas purification is provided with a cylindrical casting 21 provided inside the exhaust passage 4, a filter main body 22 that is accommodated inside the casing 21 to trap the PM, an oxidation catalyst 23 disposed upstream of the filter main body 22, exhaust gas temperature detection means (exhaust gas temperature sensors) 24, 24 for detecting a temperature inside the casting 21, and collected amount detection means 25 for detecting the collected amount of the PM collected in the filter main body 22.

The filter main body 22 can be, for example, a closed-type ceramic honeycomb having a honeycomb structure from a porous ceramic, wherein inlet ports and outlet ports of the honeycomb are alternately closed.

The oxidation catalyst 23 can have a configuration in which, for example, platinum (Pt) or the like is supported on a support body having a honeycomb structure from a porous ceramic.

A plurality of exhaust gas temperature sensors 24 are provided. In the examples shown in the figure, the sensors are disposed upstream of the oxidation catalyst 23 and between the oxidation catalyst 23 and the filter main body 22. These exhaust gas temperature sensors 24, 24 are connected to the engine ECU 6, and the detected exhaust gas temperature values are inputted to the engine ECU 6.

In the present embodiment, the collected amount of PM in the filter main body 22 is found on the basis of pressure difference between zones in front and behind the filter main body.

More specifically, the collected amount detection means 25 is provided with a conduction pipe 31 connected to the casing 21 upstream of the oxidation catalyst 23 and downstream of the filter main body 22 and a differential pressure sensor 32 provided inside the conduction pipe 31.

The differential pressure sensor 32 is connected to the engine ECU 6, and the detected differential pressure is inputted in the engine ECU 6. The engine ECU 6 finds the collected amount of the filter main body 22 on the basis of the differential pressure of the differential pressure sensor 32.

For example, a relationship between a collected amount of PM and a differential pressure is found in advance, for example, by performing tests, this relationship is stored as a map in the engine ECU 6, and the engine ECU 6 finds the collected amount of PM on the basis of this map and the differential pressure detected by the differential pressure sensor 32.

In the filter device 5 for exhaust gas purification that has the above-described configuration, basically a continuous regeneration is performed in which the PM trapped in the filter main body 22 is continuously oxidized and removed (combusted) under the effect of the oxidation catalyst 23, but it is possible that the regeneration will not be performed when the exhaust gas temperature is low, for example, in a low-load mode of the engine 2.

Accordingly, in the vehicle 1 of the present embodiment, a filter regeneration device (6, 11) for regenerating (or enhancing the regeneration) of the filter device 5 for exhaust gas purification is provided.

The filter regeneration device (6, 11) is configured by the engine ECU 6 and the injector 11, and the engine ECU 6 controls the fuel injection amount and fuel injection period of the injector 11 to increase the exhaust gas temperature, thereby regenerating the filter device 5 for exhaust gas purification.

The engine ECU 6 is connected to, and outputs control signals to, actuators such as the injector 11, intake throttle valve 12, and pressure-controlled diverting valve 17 of the exhaust brake device 13.

Furthermore, sensors such as the exhaust gas temperature sensor 24 of the filter device 5 for exhaust gas purification, the differential pressure sensor 32, an engine revolution sensor, and an accelerator pedal sensor (not shown in the figure) are connected to the engine ECU 6, and detection signals from these sensors are inputted thereto.

The engine ECU 6 basically determines and controls the fuel injection amount and fuel injection period of the injector 11 on the basis of the operation state (engine revolution speed, accelerator opening degree, and the like) of the engine 2.

The engine ECU 6 of the present embodiment is connected to the filter regeneration execution switch 9, and when the filter regeneration execution switch 9 is switched ON, the engine ECU 6 performs fuel injection control (referred to hereinbelow as "regeneration injection control") for regenerating the filter device 5 for exhaust gas purification.

Control of various types that raise the exhaust gas temperature, for example, by delaying the fuel injection period or performing post-injection after the main injection, can be considered for the regeneration injection control. Where the exhaust gas temperature is raised by the regeneration injection control, the oxidation catalyst 23 is activated, PM collected in the filter main body 22 is oxidized, and the filter device 5 for exhaust gas purification (filter main body 22) is regenerated.

The display device 8 for a vehicle has a segment display unit 41 (display, odometer—trip display) that can display numerical values of a plurality of digits and is provided with a segment group 61 (see FIG. 3) that displays a value of each digit, a display control unit 42 for displaying a travel distance of the vehicle 1 at the segment display unit 41, a changeover switch 43 for instructing the display control unit 42 to switch between the travel distance display and the collected amount display, a collection/regeneration display unit (referred to hereinbelow as "collection/progress state indicator") 44 that can light up any of two different colors, a unit 45 for acquiring data relating to the filter for exhaust gas purification, and a unit 46 for acquiring data relating to travel distance that serves as a distance storage means for storing the travel distance of the vehicle 1. In the present embodiment, the display control unit 42, unit 45 for acquiring data relating to the filter for exhaust gas purification, and unit 46 for acquiring data relating to travel distance are integrated as a CPU and configured to enable mutual communication thereof.

The changeover switch 43 is disposed, for example, in the cab 7 of the vehicle 1. The changeover switch 43 is connected to the display control unit 42 and inputs in the display control unit 42 a signal (distance display signal, collected amount display signal) that instructs the display control unit to display either the travel distance or the collected amount.

The unit 45 for acquiring data relating to the filter for exhaust gas purification is connected to the ECU 6 and inputs from the engine ECU 6 the collected amount of the PM in the filter main body 22 that has been found by the engine ECU 6 and a signal indicating whether the regeneration injection control is executed.

The unit 46 for acquiring data relating to travel distance is connected, for example, to a vehicle speed sensor (indicated as "various sensors 47" in FIG. 1) that detects the revolution speed of an output shaft of a transmission and finds and stores a travel distance (integral distance, zone distance) on the basis of the revolution speed of the output shaft detected by this vehicle speed sensor.

The display control unit 42 is connected to the segment display unit 41 and the collection/progress state indicator 44 and controls the display by lighting up, turning off, or blinking the segments of the segment display unit 41 or collection/progress state indicator 44.

The collection/progress state indicator 44 can be lit up in green or orange color. For example, a LED or the like can be used therein.

Figure 2:
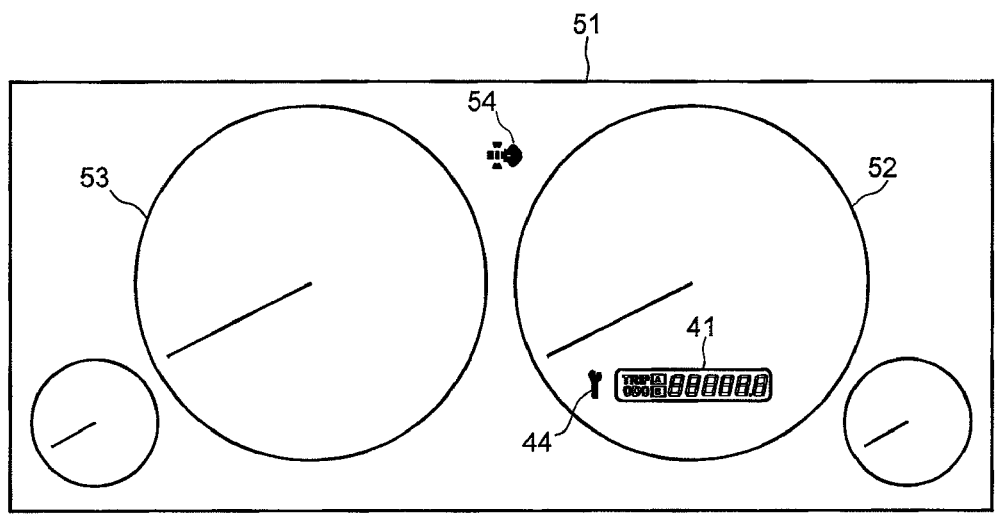
FIG. 2 shows an instrument panel of the present embodiment.

As shown in FIG. 2, an instrument panel 51 of the vehicle 1 (cab 7) is provided with a speedometer, 52, a chronometer 53, the segment display unit 41, the collection/progress state indicator 44, and a DPD indicator 54 that lets the driver know that the segment display unit 41 is used for displaying the collected amount.

The speedometer 52 and tachometer 53 are arranged side by side on the left and right side. The segment display unit 41 and the collection/progress state indicator 44 are disposed close to each other in the lower portion of the speedometer 52.

Figure 3:
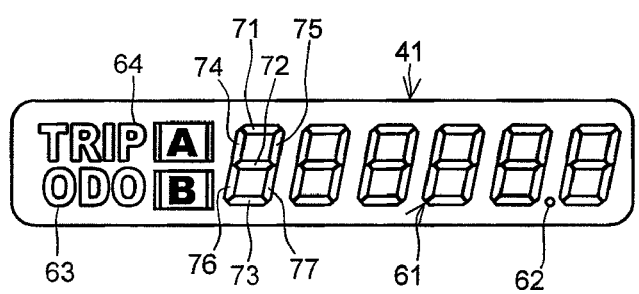
FIG. 3 shows a segment display unit of the present embodiment.

As shown in FIG. 3, the segment display unit 41 has a plurality (six in the example shown in the figure) of segment groups 61 for displaying Arabic digits, a dot segment 62 for displaying a decimal point, an odometer indicator 63 that indicates the integral distance display mode, and a trip indicator 64 that indicates the zone distance (two: A and B) display mode.

The segment groups 61 are disposed side by side in a row in the horizontal direction, and the dot segment 62 is disposed between the rightmost segment group 61 and the second segment group 61 from the right.

Each segment group 61 is a seven-segment display that is configured by arranging seven segments 71 to 77 to obtain an 8-like shape. Thus, the segment group 61 has transverse segments 71 to 73 that extend in the horizontal direction at the top, in the middle, and at the bottom, two upper vertical segments 74 and 75 extending from both ends of the upper transverse segment 71 to respective ends of the medium transverse segment 72, and two lower vertical segments 76, 77 that extend from both ends of the medium transverse segment 72 to respective ends of the lower transverse segment 73.

The segments 71 to 77 are, for example, LEDs or liquid crystals, and each of segments 71 to 77 is controlled independently.

The operation of the display device 8 for a vehicle of the present embodiment will be explained below.

The display control unit 42 normally acquires the travel distance from the unit 46 for acquiring data relating to travel distance and displays the travel distance as numerical values at the segment display unit 41. Together with displaying the travel distance, the display control unit 42 turns off the DPD indicator 54 and collection/progress state indicator 44.

An example of displaying the collected amount and regeneration progress state with the display device 8 for a vehicle will be explained below based on FIG. 4.

In FIG. 4, the first column indicates a state of the filter device 5 for exhaust gas purification, the second column indicates a state of the segment display unit 41, a third column indicates a state of the collection/progress state indicator 44, and a fourth column indicates a state of the DPD indicator 54.

When the driver instructs the display to show the collected amount of PM by operating the changeover switch 43, the display control unit 42 lights up the DPD indicator 54 and determines whether the engine ECU 6 is executing the regeneration injection control.

When the engine ECU 6 does not execute the regeneration injection control, the display control unit 42 lights up the green light at the collection/progress state indicator 44 and also lights up the number of segment groups 61 corresponding to the collected amount of PM inputted via the unit 45 for acquiring data relating to the filter for exhaust gas purification, thereby displaying the collected amount.

As shown in FIG. 4, in the present embodiment, the collected amount is displayed in the form of columnar graphs of 0 to 5 stages. The display control unit 42 basically uses five segment groups 61 (left and inner segment groups) from among the six segment groups 61.

For the segment groups 61 that are used to be shown to the driver, the display control unit 42 constantly lights up a predetermined segment (the lower transverse segment 73 in the example shown in the figure) of the segment group 61 of each digit that is used for display in the segment display unit 41 when the collected amount is displayed.

The display control unit 42 lights up the number of segment groups 61 corresponding to the collected amount sequentially from the left segment group 61. More specifically, the middle and lower transverse segments 72 and 73 and the lower vertical segments 76 and 77, from among the segments 71 to 77 of the segment groups 61, are lit up. In other words, the segment groups 61 are lit up to form squares.

Where the engine ECU 6 executes the regeneration injection control when the changeover switch 43 is operated, or when the regeneration injection control is started in the course of displaying the collected amount, the display control unit 42 lights up the orange color at the collection/progress state indicator 44 and lights up the number of segment groups 61 corresponding to the collected amount of PM inputted via the unit 45 for acquiring data relating to the filter for exhaust gas purification, thereby displaying the regeneration progress state.

When a regeneration progress state is displayed, the display control unit 42 lights up in a square-like configuration the number of segment groups 61 corresponding to a collected amount sequentially from the left segment group 61, in the same manner as when a collected amount is displayed, and blinks the rightmost segment group 61 from among the segment groups 61 that are lit up.

This is done because the display variation of the collected amount of PM is longer in time than the display variation of the regeneration progress state, and if a blinking display of the collected amount is performed, it would be troublesome for the driver. Accordingly, a blinking display is performed only when the regeneration progress state is displayed.

When the regeneration progress state is displayed, the display control unit 42 lights up the lower transverse segments 73 at all times.

When the display control unit 42 cannot display the collected amount of PM found by the engine ECU 6 (for example, in the case of an abnormal numerical value), error display is performed (see seventh line from the top of second column in FIG. 4).

Thus, in the present embodiment, the collected amount of PM and regeneration progress state of the filter device 5 for exhaust gas purification can be displayed at the odometer—trip meter that is typically installed in the vehicle 1. Therefore, the state (collected amount of PM and regeneration progress state) of the filter device 5 for exhaust gas purification can be displayed by using only software means with a standard component configuration, that is, without adding new components such as a display unit.

In other words, the odometer—trip meter can be effectively used by displaying data relating to travel distance and data relating to collected amount of PM by using a common segment display unit 41.

As a result, a special display device that indicates the state of the filter device 5 for exhaust gas purification can be omitted, the production cost of the instrument panel 51 can be reduced, and the degree of freedom in designing the arrangement or meters can be increased.

In addition, because data relating to the PM collected amount is displayed in stages by the segment group 61, it is possible to provide information that is more detailed than in the case of lighting a warning lamp correspondingly to the collected amount of PM.

Furthermore, because the odometer—trip meter, which is typically installed in the vehicle 1 can be effectively used, data relating to the PM collected amount can be displayed in a position viewable by the driver from almost the front surface.

Because the changeover switch 43 is provided, the driver can get the data relating to the filter device 5 for exhaust gas purification from a desired period.

Furthermore, when the display is performed in stages by using the segment group 61, all the lower segments 73 used for the display are lit up. Therefore, segments 73 that establish a maximum and a minimum for data relating to the filter device 5 for exhaust gas purification, within the changing segment group 61, are lit up at all times and the variation amount can be displayed in the form easily understandable to the user.

In addition, when the engine ECU 6 executes the regeneration injection control, the progress state of the regeneration can be shown to the driver with good visibility.

By blinking the segment group 61 at the right end when the regeneration progress state is displayed, it is possible to differentiate between data display of collected amount of PM and data display of regeneration progress state, and the driver can effectively discriminate between the displays.

Furthermore, because the color of the collection/progress state indicator 44 is changed between the display of collected amount of PM and display of regeneration progress state, the user can easily recognize whether the present display shows data relating to PM collected amount or data relating to filter regeneration state.

The present invention is not limited to the above-described embodiment and various modification examples and application examples thereof can be considered.

For example, the above-described segment display unit 41 is a 7-segment display, but such a configuration is not limiting and a 14-segment display may be also used.

Furthermore, a variety of filter regeneration devices can be considered. For example, a heater that is provided in the filter device for exhaust gas purification and heats the filter main body may be used.

What is claimed is:

1. A display device for a vehicle, comprising: a segment display unit that can display a numerical value of a plurality of digits and is provided with segment groups that display values of each digit; and a display control unit for displaying a travel distance of the vehicle on the segment display unit,
    wherein the vehicle comprises: distance storage means for storing a travel distance; a filter device for exhaust gas purification for trapping a particulate matter contained in an exhaust gas; and collected amount detection means for finding an amount of the particulate matter collected in the filter device for exhaust gas purification, and
    the display control unit normally acquires a travel distance from the distance storage means and displays the travel distance as a numerical value on the segment display unit, and when instructed to display a collected amount of the particulate matter, the display control unit acquires a collected amount from the collected amount detection means and lights up the number of segment groups corresponding to the collected amount, thereby displaying the collected amount.

2. The display device for a vehicle according to claim 1, comprising a changeover switch for instructing the display control unit to switch between a travel distance display and a collected amount display.

3. The display device for a vehicle according to claim 1, wherein the display control unit lights up predetermined segments of the segment groups of each digit of the segment display unit when a collected amount is displayed.

4. The display device for a vehicle according to claim 1,
    wherein the vehicle comprises a filter regeneration device for oxidizing the particulate matter collected in the filter device for exhaust gas purification and regenerating the filter device for exhaust gas purification, and the display control unit displays a regeneration progress state by lighting up the number of segment groups corresponding to a collected amount of the particulate matter detected by the collected amount detection means, when the filter device for exhaust gas purification is regenerated by the filter regeneration device.

5. The display device for a vehicle according to claim 4,
wherein the segment groups of the segment display unit are arranged side by side in a row in a horizontal direction, and when a regeneration process state is displayed, the display control unit lights up the number of segment groups corresponding to a collected amount successively from a segment group on either the left or right side and blinks a segment group closest to the other side from among the segment groups that are lit up.

6. The display device for a vehicle according to claim 5, comprising a collection-regeneration display unit that can be lit up in two different colors and whose display is controlled by the display control unit,
wherein the display control unit lights up one of the colors on the collection-regeneration display unit when the collected amount is displayed on the segment display unit and lights up the other color on the collection-regeneration display unit when the regeneration progress state is displayed.

7. The display device for a vehicle according to claim 6, wherein the segment display unit and the collection-regeneration display unit are disposed close to each other on an instrument panel of the vehicle.

\* \* \* \* \*